(No Model.)

J. M. BENNETT.
BARREL TRUCK.

No. 336,620. Patented Feb. 23, 1886.

Attest.     Fig. 5.     Inventor.
John M. Bennett
per
Wm. Hubbell Fisher
Atty.

UNITED STATES PATENT OFFICE.

JOHN M. BENNETT, OF CINCINNATI, OHIO, ASSIGNOR TO SAMUEL C. TATUM & CO., OF SAME PLACE.

BARREL-TRUCK.

SPECIFICATION forming part of Letters Patent No. 336,620, dated February 23, 1886.

Application filed September 7, 1885. Serial No. 176,376. (No model.)

*To all whom it may concern:*

Be it known that I, JOHN M. BENNETT, a citizen of the United States, and a resident of the city of Cincinnati, in the county of Hamilton and State of Ohio, have invented certain new and useful Improvements in Barrel-Trucks, of which the following is a specification.

The several features of my invention and the advantages resulting from their use will be fully hereinafter set forth.

Figure 1:
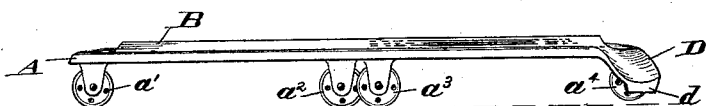
Figure 2:
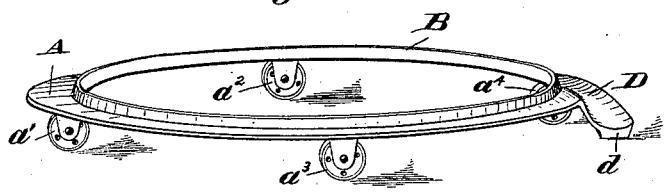
Figure 3:
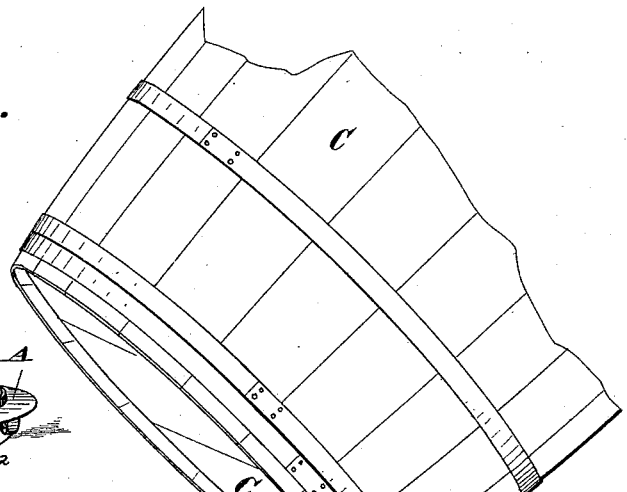
Figure 4:
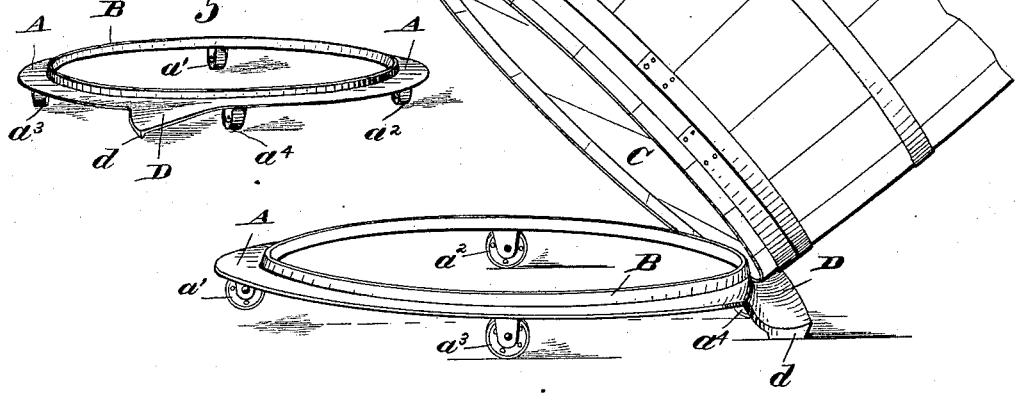

In the accompanying drawings, Figure 1 is a side elevation of a device illustrating my invention. Fig. 2 shows the device in perspective. Fig. 3 illustrates the operation of mounting a barrel on the truck or carriage. Fig. 4 may be termed a rear view showing the inclined portion of the truck up which the barrel is rolled in mounting it. Fig. 5 is a view in perspective showing my improved truck as provided with two inclined planes or portions.

The platform A is mounted on a set of three or more casters or wheels, preferably four in number, as $a'$ $a^2$ $a^3$ $a^4$. This platform may be of any designed outline, but is preferably circular, to conform to the shape of the barrel or equivalent package. It may be a solid plane, or it may be annular, as shown in the drawings. This latter construction is preferable, on account of lightness. The flange B is present to impart strength to the truck, and at the same time allow of the platform A being made much lighter than it would otherwise have to be. This flange also serves to securely retain the barrel in position on the truck. This flange B extends from the platform A, preferably upward, as shown.

By reference to Fig. 1 it will be seen that the two side casters, $a^2$ $a^3$, project farther down than the two end casters, $a'$ $a^4$. This arrangement allows the platform to be tipped slightly, for a purpose which will described further on. From the edge of the platform an inclined plane or portion, D, extends downwardly and to the right or left—usually toward the left, as shown in Fig. 4, when but one incline is employed. A caster, as $a^4$, is preferably located to right of the inclined portion and near to the same, as shown in Fig. 4. This inclined plane extends downward almost as far as the caster $a^4$. At its free end it is better to have it provided with the edge or projection $d$. This projection is made sufficiently sharp or pointed to engage the ground or floor on which the truck is with sufficient firmness to prevent the truck moving while the barrel is being mounted on the truck.

In operation the barrel C is rolled up the inclined plane D, and when up the barrel is let down onto the platform A, and the flange B fits within the chine of the barrel. While the barrel is being rolled up the inclined plane, the truck is tilted down at the side where the inclined portion is, and rests on the casters $a^4$ and $a^3$ and on the edge or projection $d$. The weight of the barrel forces the projection $d$ against the floor and holds the carriage stationary, preventing it running away from the barrel.

In place of the edge or projection $d$, other means may be used to hold the truck still. For instance, two or more of such projections $d$ may be employed, and these may be of different lengths relatively to the plane of the platform A, so that the longest projection shall engage the floor before the next, and so on; or the projection $d$ may have a file-like surface, or the like. When the barrel is mounted on the truck, the flange B fits within the chine of the barrel. The flange B may be located at the outer edge or portion of the platform, instead of at its inner edge, and in such event will preferably be broken away at and in the vicinity of the inclined portion, to prevent the chine from crossing it (said flange) as the barrel is lowered onto the platform. When the flange is located at the outer edge or portion of the platform, the chine of the barrel, when the barrel is mounted on the platform, will fit within this flange B. When the barrel is mounted on the truck, as the two center casters, $a^2$ $a^3$, are farther from the platform than the other casters, $a'$ $a^4$, the main weight of the barrel and truck rests on casters $a^2$ $a^3$, the barrel being balanced, or nearly so over, them. This fact enables the barrel and platform to be revolved, the same as on revolving casters. When the barrel is once mounted on the truck, it may be moved about from place to place very readily. This is a great convenience in crowded groceries, &c, The truck may also be used as a truck for short transportations of barrels and the like.

In Fig. 5 is shown a double-incline portion consisting of the inclines D D', each of the inclines preferably having a projection (respectively indicated by $d$ $d'$) or equivalent means for frictionally engaging the floor.

The advantage of the double incline consists, principally, in that it admits of rolling the barrel from either the right or left of the truck or incline up onto the incline and truck without first shifting the barrel.

What I claim as new and of my invention, and desire to secure by Letters Patent, is—

1. A barrel truck or carriage having a discal or circular frame mounted on wheels and provided with an inclined plane or portion located at the periphery of the truck-carriage, the length of the incline being nearly coincident with the periphery of said carriage, substantially as and for the purposes specified.

2. The platform A, mounted on casters and provided with inclined plane D, provided with frictional portion $d$, substantially as and for the purposes specified.

3. The platform A, provided with casters $a'$ $a^2$ $a^3$ $a^4$ and inclined portion D, substantially as and for the purposes specified.

4. The combination of the platform mounted on wheels and provided with flange B and inclined portion D, substantially as and for the purposes specified.

5. The platform A, mounted on casters $a'$ $a^2$ $a^3$ $a^4$, the casters $a^2$ $a^3$ being farther down from the platform than casters $a'$ $a^4$, caster $a^3$ being opposite caster $a^2$, and caster $a'$ being opposite caster $a^4$, and incline D, the caster $a^4$ being in the vicinity of the said incline, substantially as and for the purposes specified.

6. The platform mounted on wheels and provided with the double incline, substantially as and for the purposes specified.

7. The combination of the platform A, flange B, casters $a'$ $a^2$ $a^3$ $a^4$, and inclined portion D, with floor-bearing, substantially as and for the purposes specified.

JOHN M. BENNETT.

Attest:
 THEO. C. BAITER,
 JNO. W. STREHLI,